June 18, 1963   N. H. KENT ETAL   3,094,270
ANNULAR VALVE DEVICE
Filed July 27, 1959   4 Sheets-Sheet 1

INVENTORS:
Nelson Hector Kent,
Richard Derby Beale, &
Robert Vaughan Blackhurst

BY

Fred E. Shoemaker &
Fred L. Witherspoon, Jr.
ATTORNEYS

June 18, 1963    N. H. KENT ETAL    3,094,270
ANNULAR VALVE DEVICE
Filed July 27, 1959    4 Sheets-Sheet 2

INVENTORS:
Nelson Hector Kent,
Richard Derby Beale, &
Robert Vaughan Blackhurst

BY

Fred E. Shoemaker, &
Fred L. Witherspoon, Jr.
ATTORNEYS

June 18, 1963 N. H. KENT ETAL 3,094,270
ANNULAR VALVE DEVICE
Filed July 27, 1959 4 Sheets-Sheet 3

INVENTORS:
Nelson Hector Kent,
Richard Derby Beale, &
Robert Vaughan Blackhurst
BY
Fred E. Shoemaker &
Fred L. Witherspoon, Jr.
ATTORNEYS June 18, 1963   N. H. KENT ETAL   3,094,270
ANNULAR VALVE DEVICE
Filed July 27, 1959   4 Sheets-Sheet 4
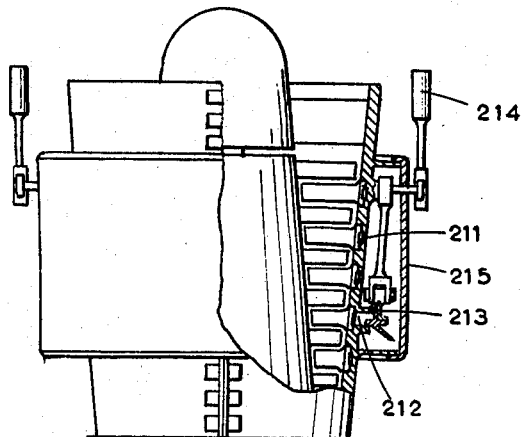
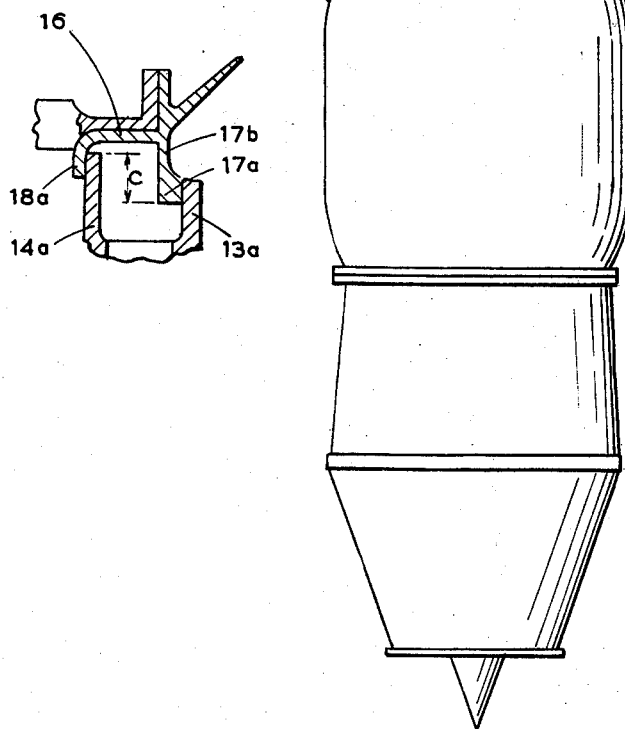
INVENTORS:
Nelson Hector Kent,
Richard Derby Beale, &
Robert Vaughan Blackhurst
BY
Fred E. Shoemaker, &
Fred L. Witherspoon, Jr.
ATTORNEYS _United States Patent Office_

3,094,270
Patented June 18, 1963

3,094,270
ANNULAR VALVE DEVICE
Nelson Hector Kent, Derby, Richard Derby Beale, Quarndon, and Robert Vaughan Blackhurst, Ripley, England, assignors to Rolls-Royce Limited, Derby, England, a company of Great Britain
Filed July 27, 1959, Ser. No. 829,692
Claims priority, application Great Britain Aug. 5, 1958
4 Claims. (Cl. 230—114)

This invention relates to annular valve devices.

An object of the invention is to provide an annular valve having a movable annular valve member which is operated by a lever mechanism which occupies a relatively small amount of space.

According to the present invention an annular valve device comprises an annular valve member movably mounted on a cylindrical casing by means of levers pivoted to the casing, the valve member being adapted to engage and seal an annular seating associated with the casing, the pivotal axis of each lever being at right angles to the plane containing the arc of rotation of the lever.

Preferably the valve member is connected to the levers by means permitting a small degree of free relative radial movement therebetween. Thus a spherical or part-spherical joint may be provided between the valve member and each lever, there being a clearance adjacent to the said joint, this clearance being sufficient to accommodate the small relative radial movement between the levers and the valve member consequent upon operation of the valve.

One particular application of the valve is to a gas turbine engine in which it is desired to bleed air from a compressor casing. This can be achieved according to the invention by forming a row of holes round the compressor casing and attaching to the compressor casing a pair of parallel annular flanges directed radially. The bleed valve can incorporate an annular movable member having a corresponding pair of inwardly directed radial flanges which seat upon the radial flanges attached to the compressor casing.

The areas of the two flanges of the bleed valve exposed to bleed air pressure can be made unequal so that bleed air pressure tends to hold the annular valve member closed.

In the case of a by-pass engine the valve and its operating levers can be accommodated in the by-pass duct and the annular valve member can be supported by, say, six equally spaced pivoted levers, only one of which is associated with an operating shaft which can pass radially across the by-pass duct and be operated by a piston and cylinder arrangement externally of the duct.

If desired a deflector can be provided in the form of an angled annular flange to cause the bleed air to be deflected in the general direction of the by-pass air.

One embodiment of the invention is illustrated, merely by way of example, in the accompanying drawings in which:

FIGURE 8 is an anlarged section of the annular valve; and

FIGURE 9 shows, diagrammatically and partly in section, a single gas turbine engine (single stage) embodying the invention.

Figure 1:
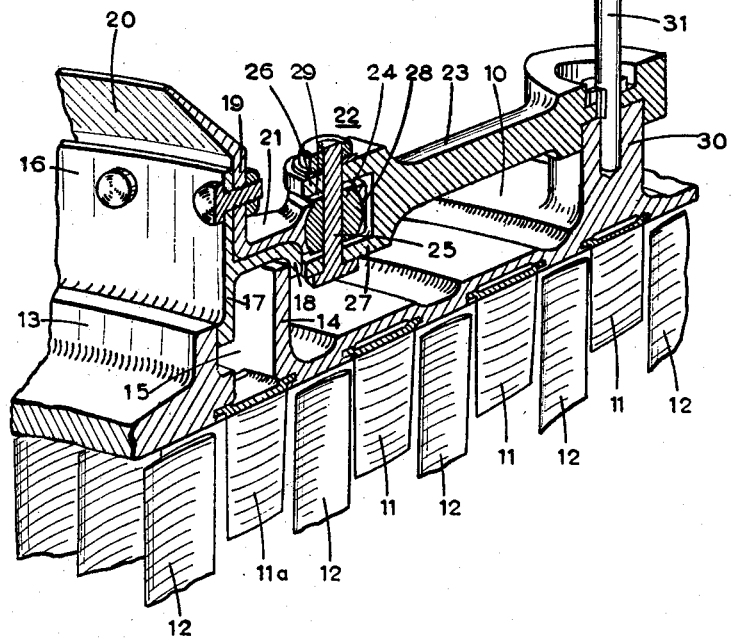
FIGURE 1 is an isometric view partly in section of a portion of a compressor casing embodying the invention.
Figure 5:
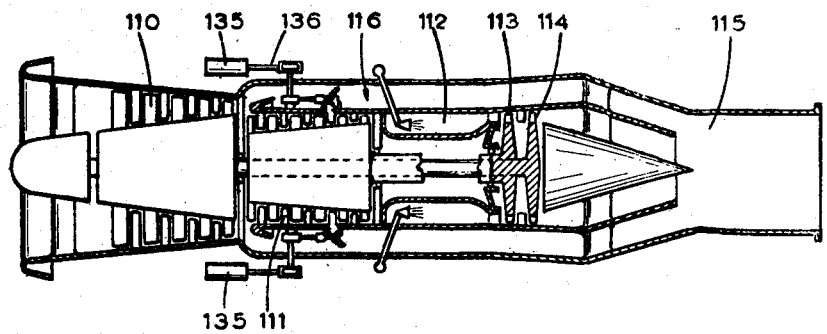
FIGURE 5 is a diagrammatic section of a compound by-pass engine embodying the invention.

In FIGURE 1 is shown a portion 10 of a compressor casing which forms part of a compound by-pass gas turbine engine (shown in FIGURE 5).

The casing 10 supports stator blades 11 of the high pressure compressor of the engine and between the rows of stator blades 11 are rows of rotor blades 12.

One particular row of stator blades 11a is arranged with apertures between adjacent blades. The apertures are flanked by radially projecting flanges 13 and 14, which form between them a bleed air chamber 15.

The bleed air chamber 15 is normally closed by an annular valve member 16 having radial flanges 17 and 18. The flanges 17 and 18 seat against flanges 13 and 14 respectively to seal the bleed chamber 15.

The annular valve member 16 is formed in two semi-cylindrical parts which are riveted to a cylindrical carrier portion 19 which is formed with a deflector flange 20 at its outer periphery. The flange 20 deflects bleed air in the general direction of the by-pass air flow.

The carrier portion 19 has axially projecting arms 21 pivoted by means of ball joints 22 on levers 23.

There are six of the levers 23 spaced equally around the periphery of the casing 10.

The ball joint 22 comprises a partly spherical member 24 journalled on a pin 25 which passes through flanges 26 and 27 on one end of the lever 23.

The part spherical member 24 is housed within a part spherical extension 28 of the arm 21. There is a closely defined clearance 29 between the flanges 26 and 27 and the extension 28 and part spherical member 24.

Each lever 23 is pivoted on a lug 30 formed on the casing 10.

Figure 2:
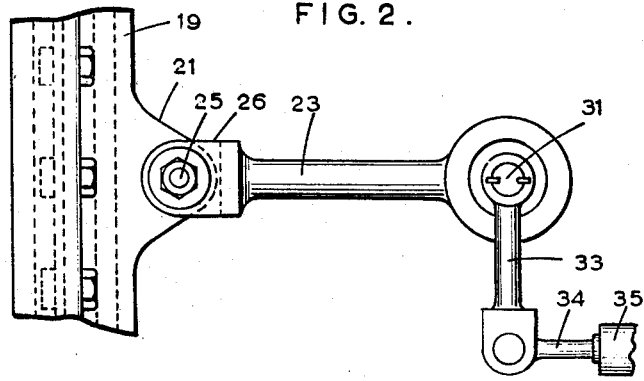
FIGURE 2 is a plan of part of the operating mechanism associated with the valve.
Figure 3:
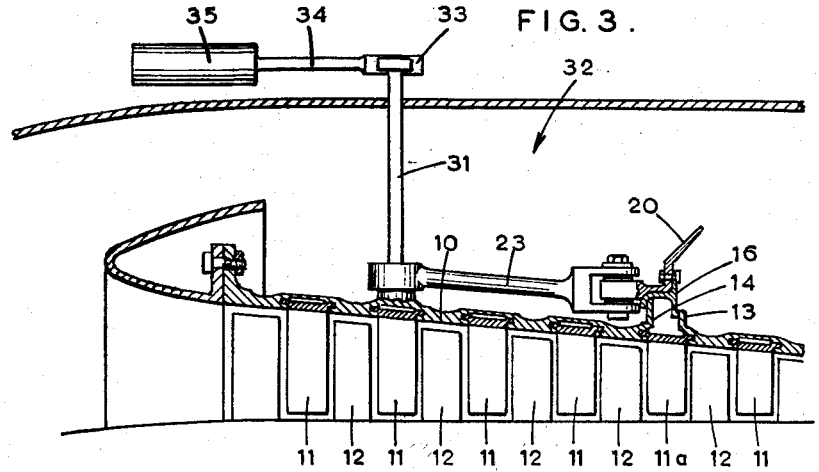
FIGURE 3 is a section of part of the same compressor casing showing the valve, its operating mechanism and part of the by-pass duct of the engine.

One of the levers 23 (the one shown in FIGURES 1, 2 and 3) is made fast with a shaft 31 which passes radially across the by-pass duct 32 (FIGURE 3).

The outer end of the shaft 31 has attached to it a lever 33 (FIGURES 2 and 3) operable by the piston rod 34 of a hydraulic ram 35.

It will be appreciated that as the ram 35 is operated, shaft 31 turns and lever 23 swings in a tangential direction with radial and axial components of movement across the surface of the compressor casing carrying the annular valve member 16 in a generally circumferential and axial movement. This produces relative radial movement between the end of the lever and the valve.

The plane of movement of the lever 23 can be calculated and the pivotal axis of the shaft 31 is chosen to correspond to the mean position of movement of the arm and it is at right angles to the plane containing the arc of movement of the arm. The pivotal axis is thus chosen so as to minimise the relative radial movement of the member 16 and lever 23 during opening and closing of the valve member.

Figure 4:
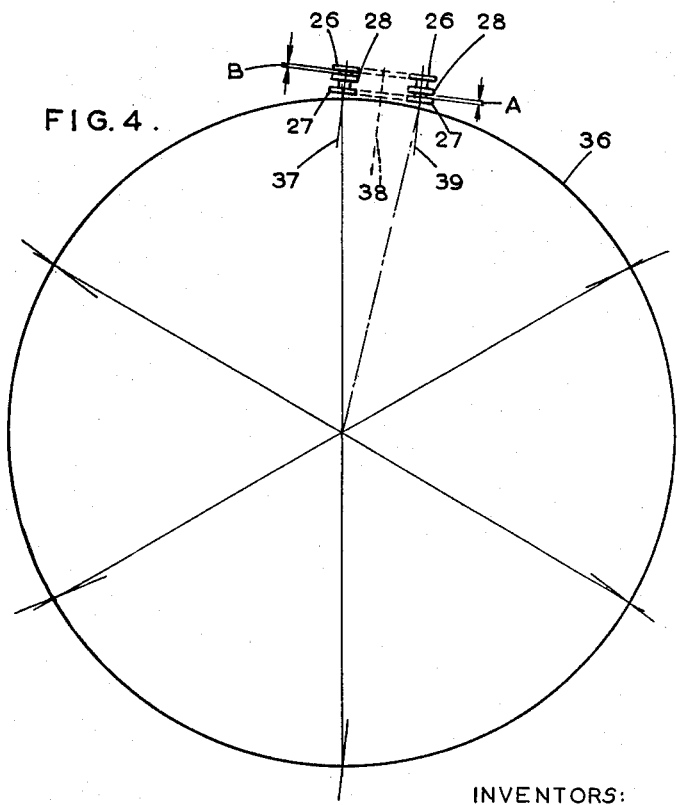
FIGURE 4 shows diagrammatically the location of the pivotal axes of the levers supporting the annular valve member.

This is illustrated in FIGURE 4 in which the circle 36 represents the compressor casing and lines 37, 38 and 39 are lines at right angles to the plane of movement of the lever in the closed, mean and open positions of the valve. The line 38 represents the mean position and the pivotal axis of shaft 31 is chosen so that it is in the position shown at 39, i.e. parallel to the line 38.

Also the clearance 29 between member 24 and flange 26 is chosen so that it is just sufficient to allow for the residual radial movement of the member 16.

The way in which this clearance is employed is shown diagrammatically in FIGURE 4. The positions of the extension 28 are shown, relatively to flanges 26, and 27 for the open and closed positions of the valve member 16 respectively. It is seen that the small clearance B is above the extension 28 in the closed position of the valve. In the open position of the valve the small clearance A is below extension 28.

The valve of this invention includes an annular valve member having a very small circumferential radial movement during travel in a generally axial direction and consequently the valve seats in substantially the same place each time it is closed.

Also the mechanism is so designed that there is very little interference with the flow of air through the by-pass duct.

The valve device described above is shown incorporated in a compound by-pass engine in FIGURE 5.

The engine comprises a low pressure compressor 110, a high pressure compressor 111, combustion chambers 112, L.P. and H.P. turbines 113 and 114 respectively and a jet pipe 115.

A by-pass duct 116 is formed round the high pressure compressor 111 and the valve is mounted, as previously described within the by-pass duct 116. Two operating pistons 135 are shown in this embodiment of the invention although only one is essential. The movable annular valve member is shown at 136, the details of the valve being as described with reference to the previous figures.

Figure 6:
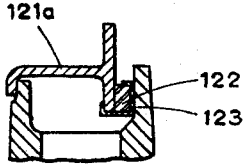
FIGURE 6 is a section through an annular valve member with a sealing ring attached.

In FIGURE 6 the annular valve member 121a has attached to it a sealing ring 122 held in place by a channel shaped clip 123.

Figure 7:
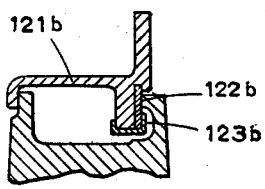
FIGURE 7 is a similar section to FIGURE 6 showing an alternative form of sealing ring.

The valve member 121b in FIGURE 7 has a different kind of sealing strip 122b attached by a channel section clip 123b.

The sealing strips 122 and 122b can be of any resilient heat resisting material.

Figure 7A:
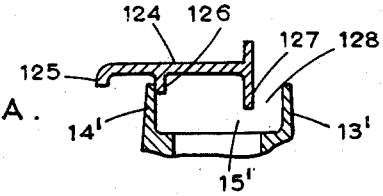
FIGURE 7A is a section similar to FIGURES 6 and 7 but showing a modified annular valve member.

In FIGURE 7A there is shown a valve member 124 having flanges 125–7. The valve member 124 is shown in FIGURE 7A in the open position in which the flange 126 makes sealing contact with the flange 14' of the bleed chamber 15', the flange 127 in this position being spaced from the flange 13' of the bleed chamber.

Thus in the open position of the valve member 124, bleed air can escape only through the gap 128 between the flanges 127, 13', that is to say the bleed air can escape only to the downstream side of the deflector 20.

In the closed position of the valve member 124 the flanges 125, 127 respectively make sealing contact with the flanges 14', 13'.

In FIGURE 8 an enlarged view of an alternative form of valve member is shown.

In this form the right hand flange 17a is formed as an enlargement of a thin disc 17b. The disc 17b, being thin, is flexible enough to allow slight bending. The dimensions are such that when the flange 18a abuts the adjacent flange 14a the flange 17a is resiliently pressed into sealing engagement with the flange 13a by the flexible disc 17b.

Also the annular area of flange 17a exposed to bleed air pressure is greater than the annular area of flange 18a exposed to the same pressure by an amount indicated by C. Consequently, bleed air pressure assists in closing the valve member 16.

This feature is applicable to any of the previously described constructions.

With the diameters of the valve flanges arranged as described above under normal engine running, when the bleed valve is not in use, air pressure is used to give an axial load on both sealing faces to provide a positive sealing pressure quite independently of the operating piston and cylinder arrangement.

By providing the annular valve with a flexible disc forming part of one flange it is possible to allow greater manufacturing tolerances, for example in the length of the levers and in the squareness of the machined faces.

By making the valve in two halves as described, assembly is facilitated.

In FIGURE 9 of the drawings is shown a non by-pass gas turbine engine embodying the invention.

The engine 210 includes a compressor 211 which has a bleed chamber 212 closed by an annular valve 213 operated by a piston 214 and contained in a manifold 215.

The details of the valve are the same as described previously with reference to FIGURE 1 except that the valve bleeds into the manifold 215 which is attached to the compressor casing.

Any convenient point can be used for extracting the bleed air from the manifold. The bleed air can be discharged from one or more outlets depending on engine requirements.

The valve can be used with any non-by-pass engine or by-pass engine. The valve can, in the case of a compound engine, be applied either to the L.P. compressor or the H.P. compressor, or both.

The valve could be operated by a pair of diametrically opposite levers to counterbalance undesired forces and make uniform the rotational movement applied to the valve member.

We claim:

1. An annular valve device comprising in combination an apertured casing circular in cross-section, a pair of parallel, outwardly directed, radial flanges on said casing, said apertures in said casing being between said casing flanges, a plurality of parallel, substantially axially extending levers spaced from each other around said casing, means mounting said levers for rotation about axes extending substantially radially of said casing, an annular valve member moveable over said casing and having three parallel, inwardly directed, radial flanges two of which are adapted in the closed position of the valve to seal against the respective casing flanges and the third of which is adapted in the open position of the valve to seal against one of the casing flanges, and joints so interconnecting said levers remote from said pivots and said valve member that pivotal movement of the levers produces axial and circumferential movement of the valve member with respect to the casing.

2. An annular valve device comprising in combination an apertured casing circular in cross section and subjected to higher fluid pressure internally than externally, a pair of parallel, outwardly directed, radial flanges on said casing, said casing being provided with a plurality of apertures between said casing flanges, a plurality of parallel, substantially axially extending levers spaced from each other around said casing, pivots mounting said levers for rotation about axes extending substantially radially of said casing, an annular member movable over said casing and having a pair of inwardly directed, radial flanges adapted to be brought into and out of sealing contact with the casing flanges, and joints so interconnecting said levers remote from said pivots and said valve member that pivotal movement of the levers produces axial and circumferential movement of the valve member with respect to the casing, said valve member flanges having unequal effective areas, the flange with the largest effective area being situated between said casing flanges and the flange with the smaller effective area being situated outside said casing flanges, by reason of which fluid controlled by the valve device urges the valve member towards the closed position.

3. An annular valve device comprising in combination a compressor casing of generally circular cross-section having apertures in a circular series therethrough, an annular valve seating associated with said compressor casing and encompassing said apertures, a plurality of parallel, substantially axially extending levers spaced from each other around said casing, means mounting said levers for rotation about axes extending substantially radially of the said casing, an annular valve member mounted on said casing for movement into and out of sealing engagement with said seating to thereby close or open said apertures, joints so interconnecting said levers and said valve member that pivotal movement of the levers produces axial and circumferential movement of the valve member with respect to the casing and seating, said valve member and levers being accommodated outside of said casing, an operating shaft extending radially outwardly of the compressor casing, and associated with one of the levers, and power means arranged externally of the casing for moving said shaft and thus effecting pivotal movement of the levers.

4. A device as claimed in claim 2 in which a spherical joint is provided between the valve member and each lever and there is a clearance adjacent said joint which is sufficient to accommodate the small relative radial movement between the levers and the valve member which occurs upon operation of the valve.

References Cited in the file of this patent

UNITED STATES PATENTS

| | | |
|---|---|---|
| 2,015,502 | Trumpler | Sept. 24, 1935 |
| 2,299,865 | Whitted | Oct. 27, 1942 |
| 2,418,801 | Baumann | Apr. 8, 1947 |
| 2,458,198 | Poole | Jan. 4, 1949 |
| 2,631,613 | Bergstrom | Mar. 17, 1953 |
| 2,672,726 | Wolf et al. | Mar. 23, 1954 |
| 2,819,836 | Eberle | Jan. 14, 1958 |
| 2,831,627 | Brunner | Apr. 22, 1958 |
| 2,886,968 | Johnson | May 19, 1959 |
| 3,030,006 | Shoup | Apr. 17, 1962 |